US011126998B1

(12) United States Patent
Bodkin et al.

(10) Patent No.: US 11,126,998 B1
(45) Date of Patent: *Sep. 21, 2021

(54) DEVICE ENABLED IDENTIFICATION AND AUTHENTICATION

(71) Applicant: Wells Fargo Bank, N.A., San Francisco, CA (US)

(72) Inventors: Joseph Bodkin, South Burlington, VT (US); John Edward Cronin, Bonita Springs, FL (US)

(73) Assignee: WELLS FARGO BANK, N.A., San Fransisco, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/434,967

(22) Filed: Jun. 7, 2019

Related U.S. Application Data (63) Continuation of application No. 15/138,579, filed on Apr. 26, 2016, now Pat. No. 10,339,521.

(51) Int. Cl.
   *G06Q 20/36* (2012.01)
   *G06Q 20/20* (2012.01)
   *G06Q 20/32* (2012.01)

(52) U.S. Cl.
   CPC ......... *G06Q 20/363* (2013.01); *G06Q 20/202* (2013.01); *G06Q 20/327* (2013.01); *G06Q 20/3224* (2013.01)

(58) Field of Classification Search
   CPC ........ G06Q 20/20; G06Q 20/22; G06Q 20/24; G06Q 20/36; G06Q 20/40; G06F 3/048
   USPC ..... 705/21, 35, 39, 41, 43, 44; 715/738, 769
   See application file for complete search history.

(56) References Cited

U.S. PATENT DOCUMENTS

| 6,158,655 | A | 12/2000 | Devries, Jr. et al. | |
|---|---|---|---|---|
| 6,222,463 | B1* | 4/2001 | Rai | G07C 5/008 340/905 |
| 8,348,154 | B2 | 1/2013 | Sims et al. | |
| 8,407,144 | B2 | 3/2013 | Roberts et al. | |
| 9,195,984 | B1* | 11/2015 | Spector | G06Q 20/322 |
| 9,317,846 | B2* | 4/2016 | Baldwin | G06Q 20/3278 |
| 2005/0043996 | A1* | 2/2005 | Silver | G06Q 10/02 705/15 |
| 2008/0004964 | A1* | 1/2008 | Messa | G06Q 20/04 705/17 |
| 2009/0024525 | A1* | 1/2009 | Blumer | G06Q 20/327 705/41 |
| 2009/0037286 | A1* | 2/2009 | Foster | G06Q 20/202 705/21 |
| 2009/0288012 | A1* | 11/2009 | Hertel | G06Q 20/326 715/738 |
| 2010/0057624 | A1* | 3/2010 | Hurt | G06Q 20/20 705/76 |

(Continued)

*Primary Examiner* — Olusegun Goyea
(74) *Attorney, Agent, or Firm* — Kilpatrick Townsend & Stockton LLP (57) ABSTRACT

Systems and methods that facilitate performing multiple transactions at once using a vehicle-based wallet are disclosed herein. The vehicle-based wallet can link to a plurality of mobile wallets and perform singular transactions with ATMs and POS machines, the singular transactions being a group transaction associated with one or more of the mobile wallets. The vehicle-based wallet can collect intended transactions between the ATMs and the POS machines and the mobile wallets, and then gather them together and perform a single group transaction made up of the individual transactions for multiple people that are within the vehicle.

20 Claims, 10 Drawing Sheets

(56) References Cited

U.S. PATENT DOCUMENTS

| | | |
|---|---|---|
| 2010/0114734 A1 | 5/2010 | Giuli et al. |
| 2012/0185355 A1* | 7/2012 | Kilroy ................ G06Q 30/0633 705/26.8 |
| 2013/0085928 A1 | 4/2013 | McKinney |
| 2013/0316703 A1* | 11/2013 | Girard ................ G06Q 30/0257 455/432.1 |
| 2013/0329888 A1* | 12/2013 | Alrabady ......... G06Q 20/38215 380/270 |
| 2014/0046842 A1* | 2/2014 | Irudayam ........... G06Q 20/3223 705/43 |
| 2014/0100931 A1* | 4/2014 | Sanchez ............... G06Q 20/102 705/14.23 |
| 2014/0164234 A1* | 6/2014 | Coffman ............... G06Q 20/14 705/40 |
| 2014/0279491 A1* | 9/2014 | Martin ............... G06Q 20/1085 705/43 |
| 2014/0279565 A1 | 9/2014 | Trump et al. |
| 2014/0351118 A1* | 11/2014 | Zhao .................... G06Q 20/102 705/40 |
| 2014/0351130 A1* | 11/2014 | Cheek .................... G06Q 20/29 705/44 |
| 2015/0058224 A1* | 2/2015 | Gaddam ............. G07B 15/063 705/44 |
| 2015/0206122 A1* | 7/2015 | Elliott .................. G06Q 20/202 705/21 |
| 2015/0220916 A1* | 8/2015 | Prakash ................ G06Q 20/40 705/41 |
| 2015/0339767 A1* | 11/2015 | Chen ..................... G06Q 20/22 705/39 |
| 2016/0012405 A1* | 1/2016 | Lynch ................. G06Q 20/386 705/16 |
| 2016/0292675 A1* | 10/2016 | Akashika ............. G06Q 20/367 |
| 2017/0236101 A1* | 8/2017 | Irudayam ........... G06Q 20/3223 382/140 |

* cited by examiner

702 — Vehicle Wallet Database

| Time | Date | User ID | Type | Source | Info | Amount | Status |
|---|---|---|---|---|---|---|---|
| 1:00 PM | 10/9/2015 | JS1234 | Payment | Bank Account | #456 | $100.00 | Pending |
| 11:00 AM | 10/9/2015 | AD4567 | Withdrawal | Bank Account | #789 | $50.00 | Pending |
| 9:00 AM | 10/9/2015 | JS1234 | Deposit | Cash | N/A | $50.00 | Pending |
| 7:00 PM | 10/8/2015 | TF7890 | Payment | Debit Card | #567438 | $20.00 | Pending |
| 5:00 PM | 10/7/2015 | JS1234 | Withdrawal | Debit Card | #654321 | $60.00 | Completed |
| 12:00 PM | 10/7/2015 | AD4567 | Deposit | Check | N/A | $100.00 | Completed |
| 7:00 AM | 10/7/2015 | JS1234 | Deposit | Check | N/A | $100.00 | Completed |
| 7:00 PM | 10/6/2015 | TF7890 | Payment | Credit Card | #987123 | $100.00 | Completed |
| 5:00 PM | 10/6/2015 | JS1234 | Payment | Credit Card | #123456 | $75.00 | Completed |

704 — Vehicle Wallet Verification Database

| User ID | Code | Verified | New Code |
|---|---|---|---|
| JS1234 | VFRD34 | Yes | --- |
| JS1234 | CGTE56 | No | Yes |
| AD4567 | VFRD34 | Yes | --- |
| TF7890 | VFRD34 | Yes | --- |

DEVICE ENABLED IDENTIFICATION AND AUTHENTICATION

CROSS-REFERENCE TO RELATED APPLICATIONS

This application is a continuation of U.S. application Ser. No. 15/138,579, entitled "DEVICE ENABLED IDENTIFICATION AND AUTHENTICATION," and filed Apr. 26, 2016, the entirety of which is incorporated herein by reference.

BACKGROUND

Automated teller machines ("ATMs") and point of sale ("POS") machines perform transactions one at a time. If there are multiple people who would like to perform a transaction, each person has to be verified, request a transaction and then complete the transaction. If a vehicle drives up to an ATM and more than one person wishes to perform a transaction then multiple transactions are required. Likewise, if there are multiple people in a vehicle and they are splitting a transaction (such as a gas purchase or paying for tolls) there is no easy way for the group to divide the payment besides exchanging cash with one another. This can lead to people tracking debts or can lead to longer wait times at the pumps or tolls while individuals in a single vehicle divide the cost amongst each other.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate performing multiple transactions at once using a vehicle based wallet. The vehicle based wallet can link to a plurality of mobile wallets and perform singular transactions with ATMs and POS machines, the singular transactions being a group transaction associated with one or more of the mobile wallets. The vehicle based wallet can collect intended transactions between the ATMs and the POS machines and the mobile wallets, and then gather them together and perform a single group transaction made up of the individual transactions for multiple people that are within the vehicle.

In an embodiment, the vehicle based wallet system can verify each of the mobile devices connecting to the vehicle based wallet system by having each of the mobile devices enter a code, unique to each user, or unique to the vehicle, into their mobile devices. The mobile devices can also be verified using GPS or other location data, by matching the location or verifying the proximity between the mobile devices and the vehicle based wallet system. The electronic connection between the vehicle based wallet system and the ATM or POS machine can also be verified by entering one or more codes in either the ATM/POS or a device associated with the vehicle based wallet system (e.g, one of the mobile devices, or another device in the vehicle). Location information can also be verified by determining whether the vehicle based wallet system and vehicle are near the ATM/POS machine, or are within a predetermined distance.

For these considerations, as well as other considerations, in one or more embodiments, a vehicle based wallet system can include a memory to store computer-executable instructions and a processor, coupled to the memory, to facilitate execution of the computer-executable instructions to perform operations. The operations can include receiving wallet registration data from a plurality of mobile devices, wherein the wallet registration data includes financial account data and security data. The operations can also include verifying the wallet registration data for the plurality of mobile devices and compiling transaction data associated with a set of transactions from the plurality of mobile devices and transmitting the transaction data to a financial transaction device. The operations can also include adjusting a vehicle wallet balance in response to receiving a notification that the financial transaction device has processed the set of transactions associated with the transaction data, wherein the adjusting the vehicle wallet balance comprises adjusting a set of wallets associated with each of the plurality of mobile devices.

In another embodiment, a method includes registering, by a device comprising a processor, a set of mobile wallets with a vehicle based wallet, wherein the registering comprises collecting financial account data and security data associated with the set of mobile wallets, and wherein the set of mobile wallets are associated with a set of corresponding mobile devices. The method also includes verifying the set of mobile wallets by matching a location of the set of mobile devices to a location of the of the vehicle based wallet and collecting transaction data associated with a set of transactions from the mobile wallets. The method also includes transmitting the transaction data to a financial transaction device and adjusting a balance of the vehicle based wallet in response to receiving a notification that the financial transaction device has processed the set of transactions associated with the transaction data.

In another embodiment, a non-transitory computer-readable medium configured to store instructions, that when executed by a processor perform operations including, receiving wallet registration data from a plurality of mobile devices, wherein the wallet registration data includes financial account data and security data and verifying the wallet registration data for the plurality of mobile devices by matching locations associated with the plurality of mobile devices to a location associated with a vehicle based wallet device. The operations can also include compiling transaction data associated with a set of transactions from the plurality of mobile devices and transmitting the transaction data to a financial transaction device in response to verifying connection between the vehicle based wallet device and the financial transaction device by matching the location of the vehicle based wallet device to a second location associated with the financial institution device. The operations can also include adjusting a vehicle wallet balance associated with the vehicle based wallet device in response to receiving a notification that the financial transaction device has processed the set of transactions associated with the transaction data, wherein the adjusting the vehicle wallet balance comprises adjusting a set of wallets associated with each of the plurality of mobile devices.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents.

Other advantages and novel features of the innovation will become apparent from the following detailed description of the innovation when considered in conjunction with the drawings.

DETAILED DESCRIPTION

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
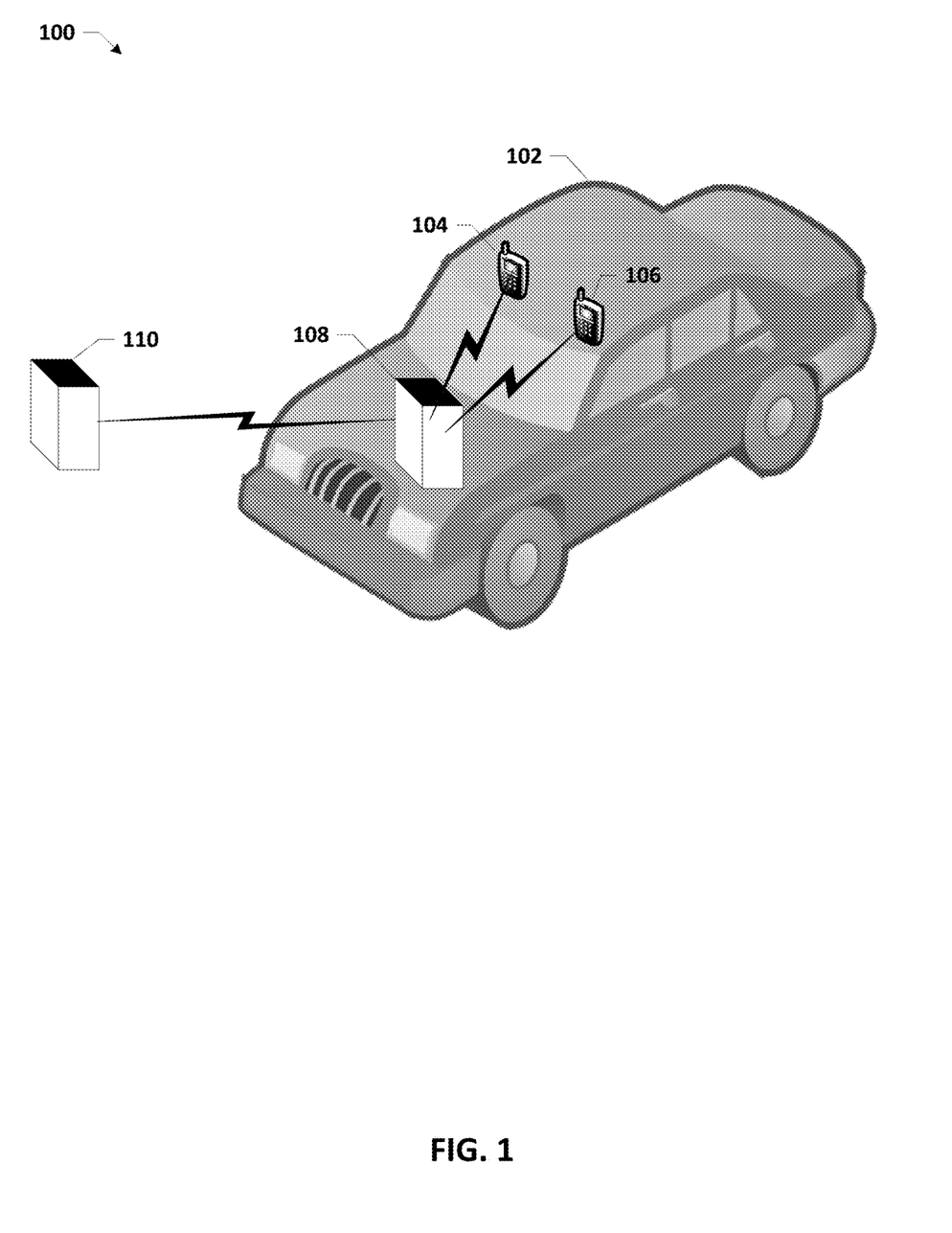
FIG. 1 is an illustration of an example vehicle based wallet system in accordance with one or more aspects of the disclosure.

FIG. 1 illustrates an example vehicle based wallet system 100 in accordance with one or more aspects of the disclosure. In system 100, a vehicle based wallet device 108 can facilitate financial transactions between mobile devices 104 and 106 situated in vehicle 102 with a financial transaction device 110. The financial transaction device 110 can be an ATM or POS device, or other device, machine, or system that can be used to facilitate financial transactions.

In an embodiment, there can be multiple users in a vehicle that may desire to perform transactions at a financial transaction device (e.g., ATM, or POS system such as at a gas station). The users individually can input their financial and security information into their mobile devices 104 and 106 via a graphical user interface ("GUI") on their mobile device and this information can be sent to vehicle wallet 108 which may be installed on the vehicle's computer. Once the user has inputted the information, the device 104 or 106 is verified by the vehicle based wallet device.

In an embodiment, the device can be verified by the user inputting a security code that is displayed on the device 108 or other display in the vehicle 102 into the mobile device 104 or 106. In other embodiments, the verification can be reversed, by either of the users associated with devices 104 or 106 entering a security code displayed on their phone into a GUI associated with the vehicle based wallet device 108. In other embodiments, instead of, or in addition to, the security code, the user can enter into their device the current radio station that the car 102's radio is currently tuned to. This can be a verification that the users associated with devices 104 and 106 are in the vehicle. In yet another embodiment, location information can be compared to perform a proximity check. The GPS location (or network based location determination or yet other location data associated with the devices 108, 104, and 106) of the user device and vehicle can be compared and if they are within a predetermined proximity, the devices 104 and 106 can be verified.

After verification, the financial information from the mobile devices 104 and 106 can be sent to the vehicle based wallet device 108 and this financial information can include the deposit or withdrawal information such as the desired transaction amount, whether it's a withdrawal or deposit, bank account information, routing number, user information, and etc., if the financial transaction device 110 is an ATM (in other embodiments, the financial transaction device 110 can be a POS machine or other transactional device). The deposit and withdrawal and deposit information can be compiled into a database in the vehicle wallet device 108 that combines the pending transactions from both devices 104 and 106 in order to provide the ATM with one transaction. The vehicle wallet device 108 can connects to the ATM 110 and a security code can be is displayed on the ATM 110. To complete the transaction, one of the users in the vehicle 102 can input the code into a GUI associated with the vehicle 102, vehicle wallet device 108 or one of the mobile devices 104 or 106 as a security measure. In addition, the location information of the vehicle based wallet 108 can also be compared with location information associated with the financial transaction device 110 to compare the locations and only allow the transactions if the locations are within a predetermined distance from each other.

The vehicle based wallet device 108 can send the multiple users transactions to the ATM 110 in order complete multiple user transactions at once, the withdrawal amount is combined in order to produce the total amount for all the users at the ATM 110 and the deposit amount is combined in order for the ATM 110 to collect the multiple deposits all at once and the appropriate accounts are credited and debited from the transactions.

If the financial transaction device 110 is a POS machine, the financial information is used to transfer the funds to the vehicle based wallet 108 so that the vehicle based wallet 108 is holding the funds from the user. The vehicle 102 or the vehicle based wallet 108 connects to the POS machine 110 and a security code is displayed on the POS machine 110 in which one of the users is required to input the code on a display of the vehicle 102 or wallet 108 or alternatively on mobile device 104 or 106 as a security measure. Similar location verification can be performed as above in addition to or in place of the security code verification. The POS machine 110 sends the required payment amount to the vehicle wallet 108 and the vehicle wallet 108 sends the funds through a database to the POS machine 110.

In an embodiment, after the financial transaction has been completed, the vehicle based wallet 108 can adjust the balances of the wallets or accounts associated with each of the mobile device 104 and 106. For instance, if deposits into accounts are made during the transaction between the vehicle wallet 108 and the ATM 110, the balance of the accounts associated with device 104 and 106 can be adjusted, or the funds available in the mobile wallets can be adjusted. Similarly, if purchases are made, the vehicle wallet 108 can adjust the funds available to each of the device 104 and 106 based on the relative proportions of each of the individual transactions.

In an example, if each of the mobile wallets associated with devices 104 and 106 have a balance of $100, and the vehicle wallet 108 is used to make a purchase of $20 of gasoline at a filling station via POS machine 110, and the user associated with device 104 contributed $15 towards the purchase, while the user associated with device 106 contributed $5 towards the purchase, the accounts associated with device 104 and 106 will be deducted based on their specified contributions, even though a single transaction of $20 is made at POS machine 110.

Figure 2:
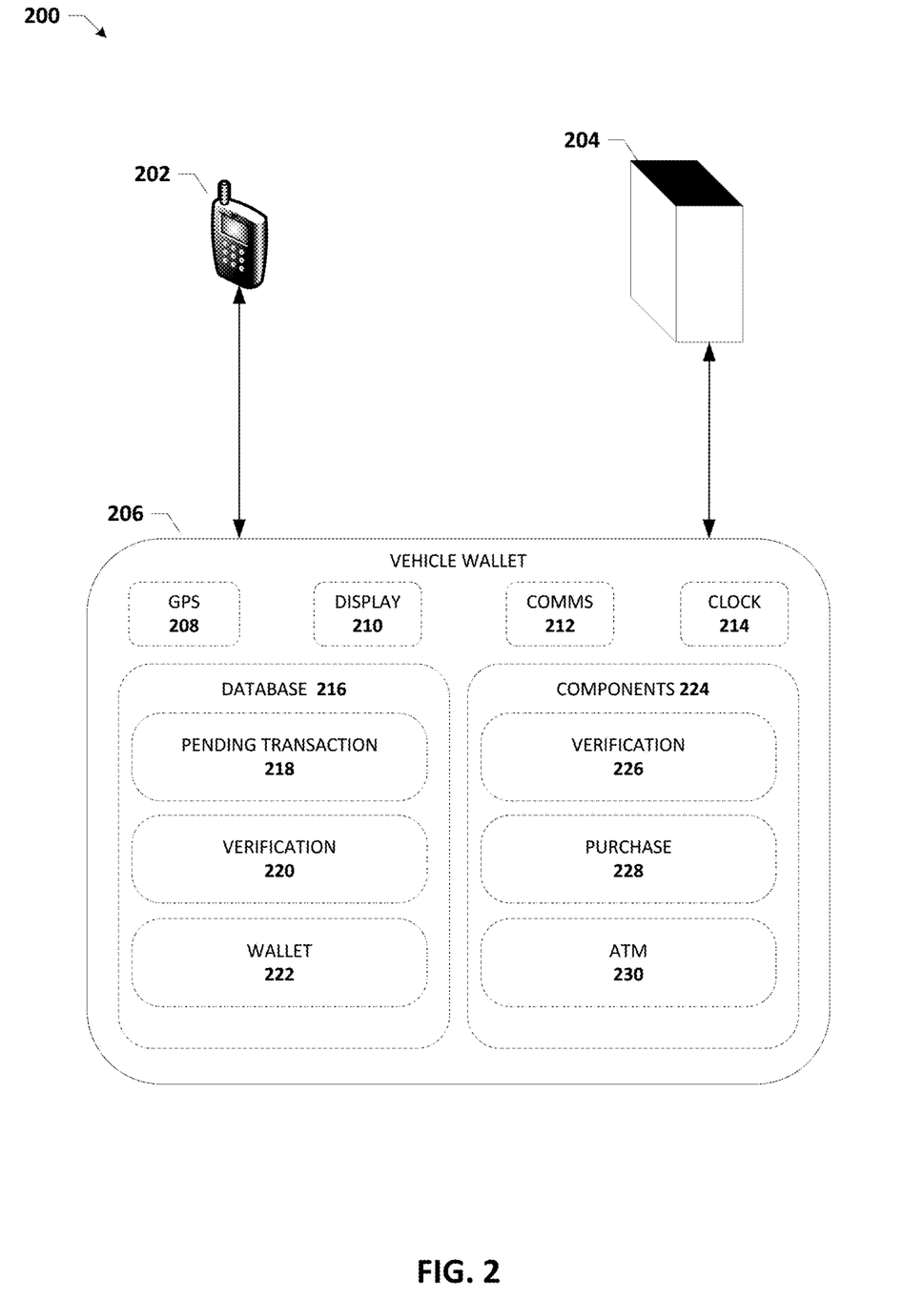
FIG. 2 is an illustration of an example vehicle based wallet system in accordance with one or more aspects of the disclosure.

Turning now to FIG. 2, illustrated is an example vehicle based wallet system 200 in accordance with one or more aspects of the disclosure.

The wallet system 200 disclosed in FIG. 2 can include a vehicle based wallet device 206 that facilitates a set of mobile devices (e.g., mobile device 202) making financial transactions with a financial transaction device 204 (e.g., ATMs, POS machines, and etc.) The vehicle wallet 206 can include a set of communications components 212 that communicate with the POS device 204 and mobile device 202 via Wi-Fi, Bluetooth, Zig-Bee, 3G, 4G, etc. The wallet can also include a GPS component 208 or other communications equipment to enable determining location information. Such other equipment can include gyroscope sensors and other movement tracking sensors. In other embodiments, the location can also be determined based on network timing based location measurements. A clock 214 can be used to measure time and a display 210 can be used for displaying security codes, and facilitating the financial transactions. In an embodiment, the display 210 can be interactive and have one or more methods for providing feedback (e.g., buttons, touch screen, etc).

In an embodiment the vehicle wallet 206 can include vehicle wallet base software which includes the vehicle wallet verification components 226, vehicle wallet data storage software for storing data in the database 216, vehicle wallet purchase components 228, and vehicle wallet ATM components 230 to facilitate financial transactions with POS machines and ATMs respectively. The vehicle wallet 206 also includes the vehicle database 216, which includes a vehicle wallet database that stores financial information associated with mobile device 202, vehicle wallet pending payment database 218, vehicle wallet verification database 220.

The process is initiated with the GUI of mobile device 202 (for which there may be multiple user device GUIs 1, 2, . . . N) and the user device base software which includes a GUI that allows the user options such as one-time transaction financial data, connected account financial data, verification inputs, password inputs, receipts and settings. The data from the user device GUI selected options is stored in the user device database, the GPS location of the vehicle and user device is compared and if there is a match the user inputs the vehicle code which is stored in the user device verification database. The user device verification database is sent to the vehicle wallet verification component 226 and if the user device receives the verification approval the user device sends the user device database to the vehicle wallet database 222.

The financial transaction device 204 connects to the vehicle wallet-based ATM component 230 or purchase component 228 if the financial transaction device 204 is an ATM or POS machine respectively, and sends the financial transaction device 204 GPS location to the respective ATM or Purchase component 228 or 230, the financial transaction device 204 sends the financial transaction device 204 security code to the display of the financial transaction device 204, and the financial transaction device 204 receives the vehicle wallet code input. If there is a match, the financial transaction device 204 sends verification approval to the vehicle wallet 206 and receives the vehicle wallet pending transaction database 218 that has a list of the pending transactions. The financial transaction device 204 then processes the pending transactions without having to finish one transaction and prompt another user to begin another transaction. In this way the financial transaction device 204 has all of the required information to begin the next transaction without having to prompt the user allowing the transactions to be completed in succession to perform a group transaction. In other words, the financial transaction device 204 can perform batch processing of transactions.

In an embodiment, the vehicle wallet base verification component 226 can be continuously polling for user devices and sends the vehicle wallet ID to the user device 202 if scanned. If the user selects verify on the user device GUI, the vehicle wallet 206 receives the user device GPS location. If the user device GPS location is a match, the vehicle wallet 206 sends a match confirmation to the user device 202, and sends the vehicle code to the vehicle display 210, and receives and compares the user device verification database to the vehicle wallet verification database 220. If there is a match, the verification component 226 sends the verification approval to the user device 202 and receives the user device database and stores it in the vehicle wallet database 222.

The database 216 receives the vehicle wallet database from the vehicle wallet based verification component 226 and extracts the transaction type from the vehicle wallet database and stores the transactions in the pending transaction database 218. The transactions can then be stored until the connection between the financial transaction device 204 and the vehicle wallet 206 is established.

In the case where the financial transaction device 204 is a POS machine, the vehicle wallet based purchase component 228 receives the vehicle wallet pending transaction database 218 from the database 216 and the purchase component 228 connects to the point of sale device 204. The purchase component 228 compares the GPS locations and if there is a match the vehicle wallet receives the bill or payment amount from the point of sale system 204. If there are sufficient funds in the vehicle wallet pending transaction database 218 and the payment amount is selected to be paid by the vehicle wallet pending transaction database 218 the user inputs the payment password, and if there is a match, the user inputs the point of sale system code from the point of sale system 204 display on the vehicle display 210. The user input is sent to the point of sale system 204 and if the purchase component 228 receives verification approval it sends the vehicle wallet pending transaction database 218 to the point of sale system 204.

In the case where the financial transaction device 204 is an ATM, the vehicle wallet based ATM component 230 receives the vehicle wallet pending deposit database and vehicle wallet pending withdrawal database from the vehicle wallet pending transaction database 218. The ATM component 230 determine total deposit and determine total withdrawal and stores the total deposit and total withdrawal in the vehicle wallet pending transaction database 218. The ATM component 230 connects to the ATM and compares the GPS location from the vehicle wallet and the ATM, if there is match the user inputs the ATM password. If the ATM password is a match the user inputs the ATM code from the ATM display on to the vehicle display, the user input is sent to the ATM component 230 and if the verification approval is received the vehicle wallet sends the vehicle wallet pending transaction database 218 to the ATM component 230.

Figure 3:
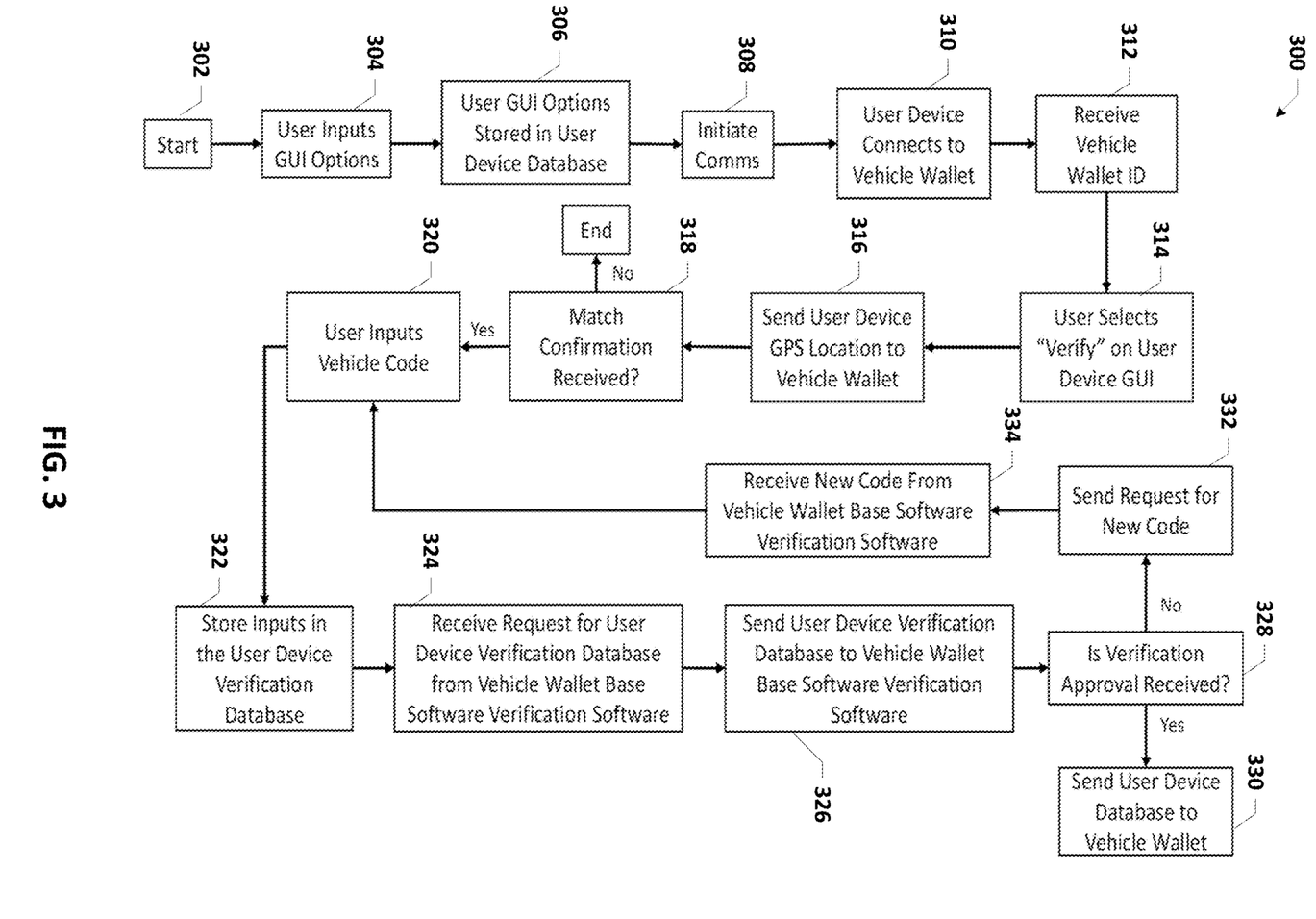
FIG. 3 is an illustration of an example flowchart for linking a mobile device and mobile wallet to a vehicle based wallet system in accordance with one or more aspects of the disclosure.

FIGS. 3-6, and 8 illustrates a process in connection with the aforementioned systems. The process in FIGS. 3-6, and 8 can be implemented for example by systems 100 and 200, illustrated in FIGS. 1-2 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter Turning now to FIG. 3, illustrated is an example flowchart 300 for linking a mobile device and mobile wallet to a vehicle based wallet system in accordance with one or more aspects of the disclosure. The method 300 can start at 302, and a user can input options via a GUI interface at 304, and at 306, the user GUI options are stored in the user device database. The communication channels are initiated at 308 and the user device connects to the vehicle wallet at 310. The user device receives the vehicle wallet ID at 312, and the user selects "verify" on the user device GUI at 314.

The user device sends the GPS location to the vehicle wallet at 316, if there is no match confirmation received then the process ends at 318, but if the match confirmation is received at 318 the user inputs the vehicle code at 320. The vehicle code input is stored in the user device verification database at 322. The user device receives a request for the user device verification database from the vehicle wallet base software verification software at 324 and the user device sends the user device verification database to the vehicle wallet base software verification software at 326. If the verification approval is not received at 328 the user device sends a request for a new code at 332 and receives a new code from the vehicle wallet base software verification software at 334 and the process returns to the user inputting the vehicle code at 320. If the verification approval is received at 328 the user device sends the user device database to the vehicle wallet at 330.

Figure 4:
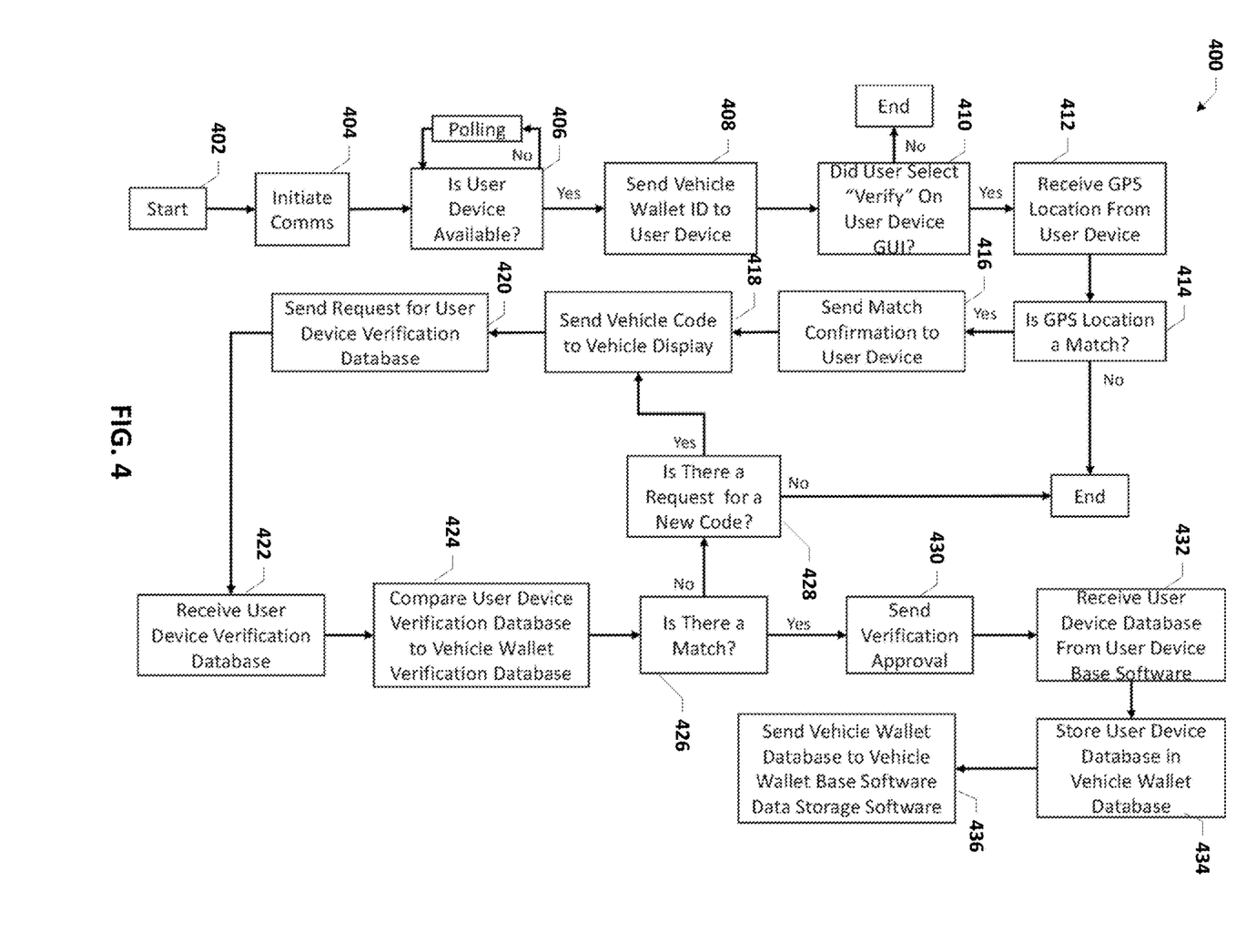
FIG. 4 is an illustration of an example flowchart for verifying a mobile device and mobile wallet with a vehicle based wallet system in accordance with one or more aspects of the disclosure.

Turning now to FIG. 4, illustrated is an illustration of an example flowchart 400 for verifying a mobile device and mobile wallet with a vehicle based wallet system in accordance with one or more aspects of the disclosure. The method 400 can start at 402 with the initiating the communication channels at 404 and continuously polling at 406 until a user device is available. Once a user device is available the verification software sends the vehicle wallet ID to the user device at 408, if the user does not select verify on the user device at 410 the process ends, but if the user does select verify on the user device GUI at 410 the verification software will receive the GPS location from the user device at 412. If the GPS location is not a match at 414 then the process ends but if there is a match at 414 the verification software sends a match confirmation at 416 to the user device and sends the vehicle code to the vehicle display at 418.

The verification software sends a request for user device verification database at 420 and receives the user device verification database at 422 which is then compared to the vehicle wallet verification database at 424. If the user device verification database and vehicle wallet verification database do not match at 426 the verification software determines if there is a request for a new code at 428, if there is the verification software sends the vehicle code to the vehicle display at 430, if there is no request for a new code then the process ends. If the user device verification database and vehicle wallet verification database do match the verification software sends the verification approval and receives the user device database from the user device based software at 432, the user device database is stored in the vehicle wallet database at 434 and the vehicle wallet database is sent to the vehicle wallet base software data storage software at 436.

Figure 5:
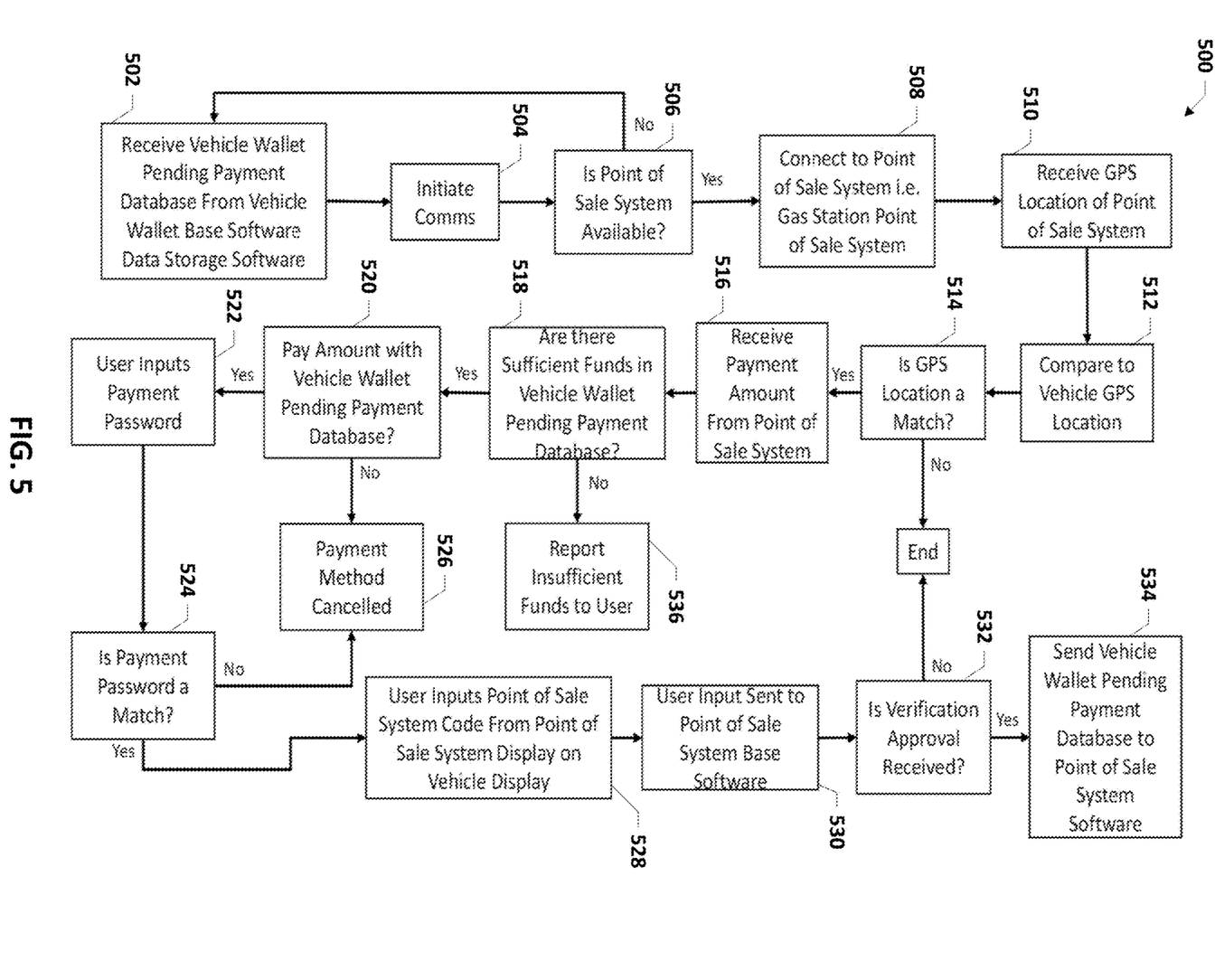
FIG. 5 is an illustration of an example flowchart for facilitating a financial transaction between a vehicle based wallet system and a point of sale device in accordance with one or more aspects of the disclosure.

Turning now to FIG. 5, illustrated is an example flowchart 500 for facilitating a financial transaction between a vehicle based wallet system and a point of sale device in accordance with one or more aspects of the disclosure. Method 500 can start at 502 where the purchase software receives the vehicle wallet pending payment database from the vehicle wallet base software data storage software. The communication channels are initiated at 504 and if the point of sale system is available at 506, the purchase software connects to the point of sale system at 508, if the point of sale system is not available at 506, then the process returns to receiving the vehicle wallet pending payment database. The purchase software receives the GPS location of the point of sale system at 510 and compares it to the vehicle GPS location at 512, if it is not a match at 514 then the process ends, but if there is a match the purchase software receives the payment amount from the point of sale system at 516.

If there are not sufficient funds at 518 in the vehicle wallet pending payment database then insufficient funds is reported to the user at 536. If there are sufficient funds in the vehicle wallet pending payment database at 518, the user determines whether or not to pay the amount with the vehicle wallet pending payment database at 520. If the user selects no at 520 then the payment method is cancelled, at 526 but if the user selects yes at 520 the user inputs the payment password at 522. If the payment password is not a match at 524 then the payment method is cancelled, but if it is a match at 524 the user inputs the point of sale system code from the point of sale system display on the vehicle display at 528. The user input is sent to the point of sale base software at 520 and if the verification approval is not received at 532 then the process ends, but if the verification approval is received at 532 then the purchase software sends the vehicle wallet pending payment database to the point of sale system software at 534.

Figure 6:
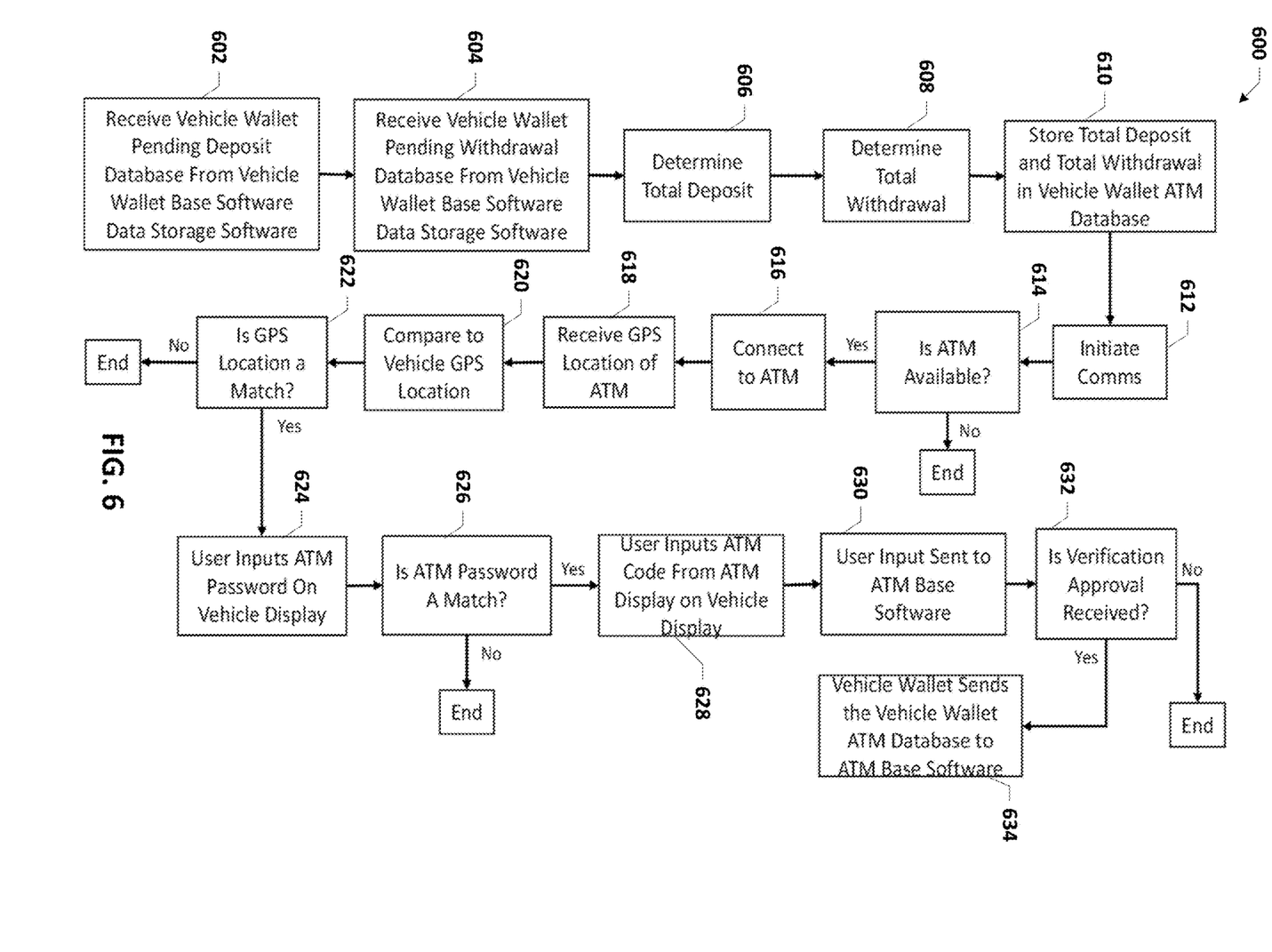
FIG. 6 is an illustration of an example flowchart for facilitating a financial transaction between a vehicle based wallet system and an automated teller machine in accordance with one or more aspects of the disclosure.

Turning now to FIG. 6, illustrated is an example flowchart 600 for facilitating a financial transaction between a vehicle based wallet system and an automated teller machine in accordance with one or more aspects of the disclosure. The method 600 can start at 602 and 604 where the ATM software receives the vehicle wallet pending deposit database and at vehicle wallet pending withdrawal database from the vehicle wallet base software data storage software. The vehicle wallet base software ATM software determines the total deposit at 606 and total withdrawal at 608 and the total deposit and total withdrawal is stored in the vehicle wallet ATM database at 610. The communication channels are initiated at 612 and if the ATM is not available at 614 the process ends, if the ATM is available the ATM software connects to the ATM at 616, receives the GPS location of the ATM at 618, and compares it to the GPS location of the vehicle at 620.

If the GPS location is not a match at 622 the process ends, but if the GPS location is a match at 622 the user inputs the ATM password on the vehicle display at 624. If the ATM password is not a match at 626 the process ends, but if it is a match the user inputs the ATM code from the ATM display on to the vehicle display at 628. The user input is sent to the ATM base software at 630 and if the verification approval is not received at 632 the process ends and if the verification approval is received the vehicle wallet sends the vehicle wallet ATM database to the ATM base software at 634.

Figure 7:
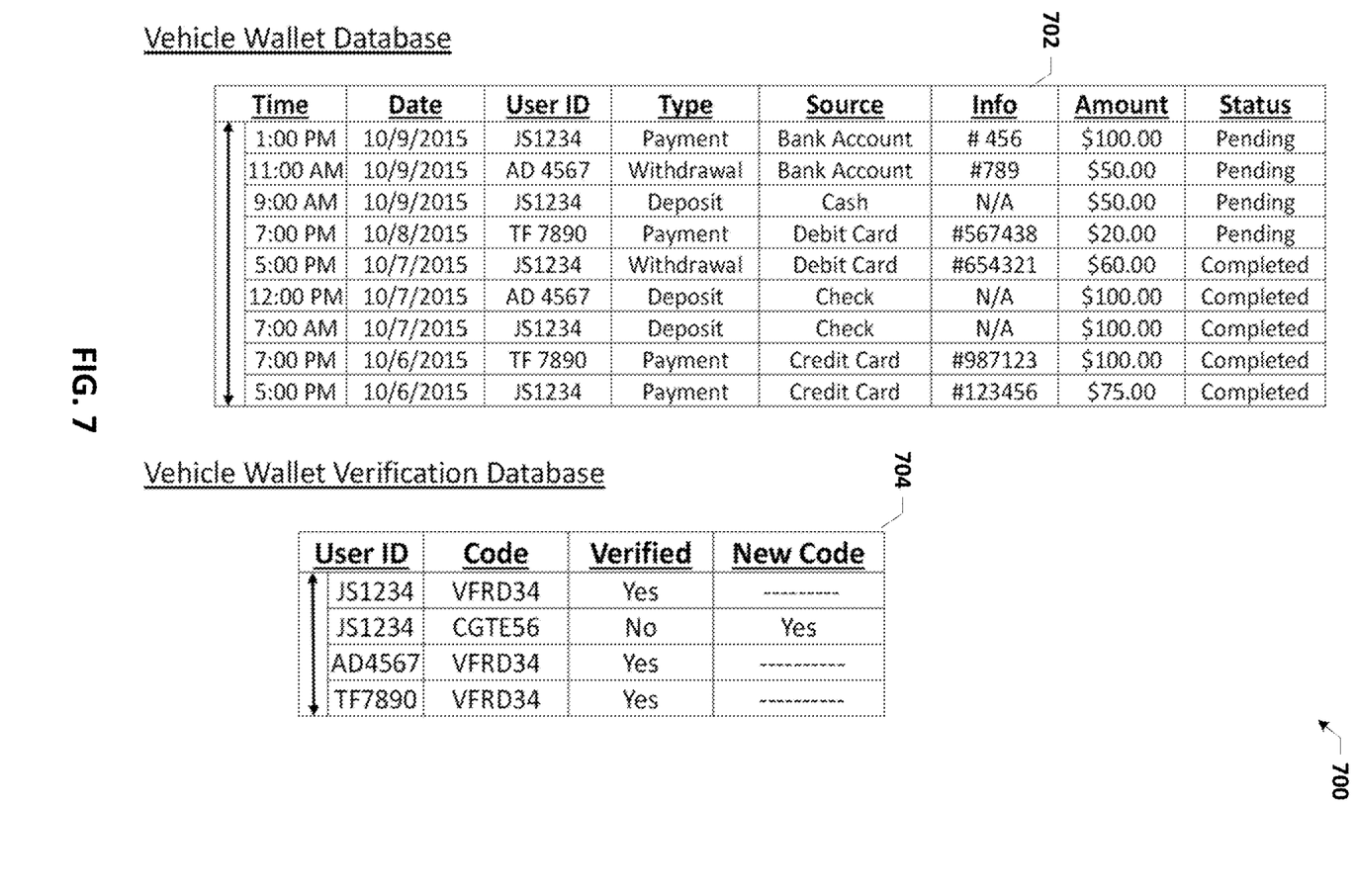
FIG. 7 is an illustration of an example chart showing a list of transactions for a vehicle based wallet system according to one or more embodiments.

Turning now to FIG. 7, illustrated in 700 are example charts showing a list of transactions for a vehicle based wallet system according to one or more embodiments. Chart 702 shows a consolidated list of pending transactions, both withdrawals and deposits from an ATM and a pending purchases from a POS device. Chart 702 can show the pending transactions stored in the pending transaction database 218 shown in FIG. 2 as an example. The pending transaction database can store the time and date at which the transactions are logged or entered. The database can also show the User ID associated with each transaction for correct attribution, and the type of transaction. The transaction database can also store the source or destination of the transaction as well as info (financial information), amount, status, and total.

The chart 704 also displays the vehicle wallet verification database which includes the user ID, code, verified (which is if the code is verified), and new code (which would be if a new code was requested). An example data entry is the user ID is JS1234, the code is VFRD34, the code is verified and no new code was requested.

The vehicle wallet verification database shown in 704 is used to determine if the user inputs the same verification code that is displayed on the vehicle display in order to allow the user device to transfer data with the vehicle wallet. The vehicle wallet verification database is compared to the user device verification database in the vehicle wallet base software verification software, if there is no match the software determines if a new code has been requested, if there is a match the software sends verification approval to the user device.

Figure 8:
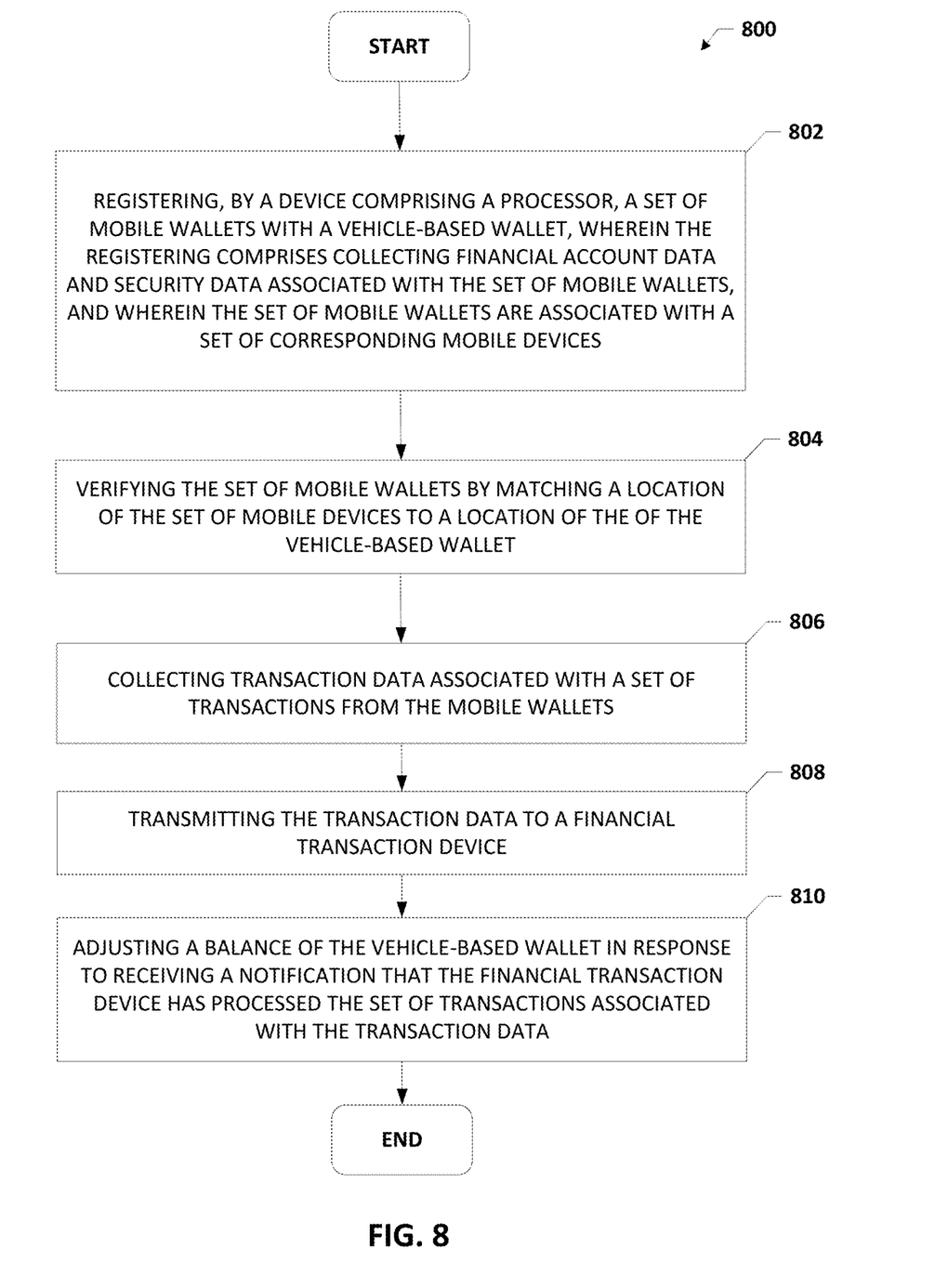
FIG. 8 is an illustration of an example flow chart of a method for facilitating financial transactions with a vehicle based wallet system according to one or more embodiments.

Turning now to FIG. 8, illustrated an example flow chart of a method 800 for facilitating financial transactions with a vehicle based wallet system according to one or more embodiments.

Method 800 can start at 802 where the method includes registering, by a device comprising a processor, a set of mobile wallets with a vehicle based wallet, wherein the registering comprises collecting financial account data and security data associated with the set of mobile wallets, and wherein the set of mobile wallets are associated with a set of corresponding mobile devices.

At 804 the method includes verifying the set of mobile wallets by matching a location of the set of mobile devices to a location of the of the vehicle based wallet. At 806, the method includes collecting transaction data associated with a set of transactions from the mobile wallets. At 808, the method includes transmitting the transaction data to a financial transaction device.

At 810, the method includes adjusting a balance of the vehicle based wallet in response to receiving a notification that the financial transaction device has processed the set of transactions associated with the transaction data.

Figure 9:
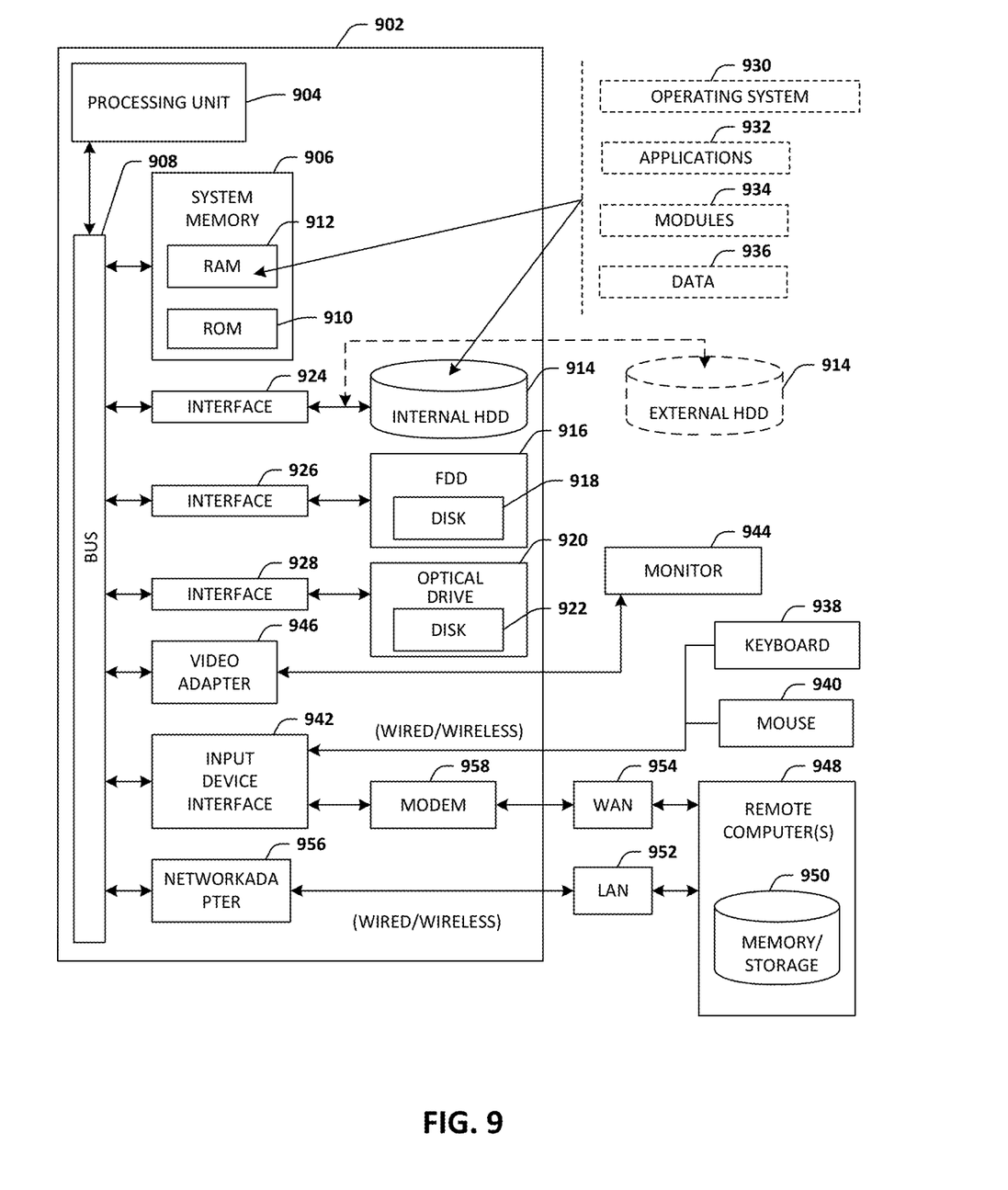
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
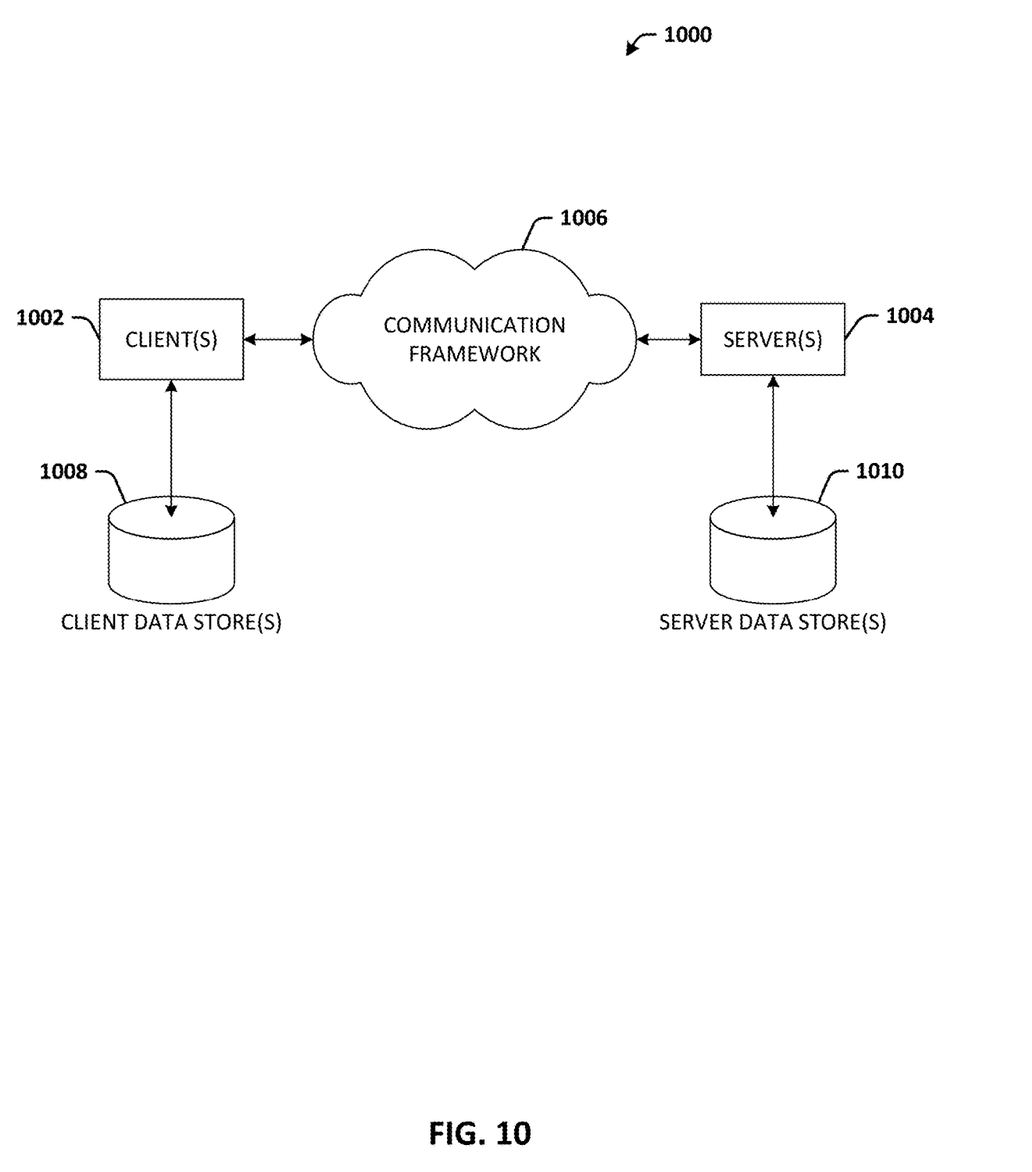
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor coupled to a memory that stores instructions that when executed by the processor cause the processor to:
   transmit transaction data, associated with a set of transactions from a plurality of mobile devices, to a financial transaction device configured to batch process the set of transactions; and
   adjust a vehicle wallet balance in response to receiving a notification that the financial transaction device has processed the set of transactions associated with the transaction data, wherein adjust the vehicle wallet balance comprises adjust a set of wallets associated with each of the plurality of mobile devices,
      wherein the financial transaction device processes pending transactions without having to finish a transaction presently being executed and simultaneously prompts a plurality of users to begin additional transactions.

2. The system of claim 1, wherein the financial transaction device is an automated telling machine, and the set of transactions are at least one of account withdrawals or account deposits.

3. The system of claim 2, further comprising instructions that cause the processor to proportion an account withdrawal or an account deposit between wallets associated with the plurality of mobile devices according to a predetermined criterion.

4. The system of claim 3, wherein the predetermined criterion is based on the transaction data associated with the set of transactions.

5. The system of claim 1, wherein the financial transaction device is a point of sale device, and the set of transactions are purchase transactions.

6. The system of claim 5, wherein the set of transactions collectively result in a single transaction with the point of sale device.

7. The system of claim 1, further comprising instructions that cause the processor to:
   receive wallet registration data, comprising financial account and security data, from the plurality of mobile devices; and verify the wallet registration data for the plurality of mobile devices.

8. The system of claim 7, wherein verify the wallet registration data for the plurality of mobile devices further comprising match a location of a vehicle associated with the vehicle wallet to locations associated with the plurality of mobile devices.

9. The system of claim 1, further comprising instructions that cause the processor to verify a connection between the vehicle wallet and the financial transaction device.

10. The system of claim 9, wherein verify the connection between the vehicle wallet and the financial transaction device further comprising match a location of a vehicle associated with the vehicle wallet to another location associated with the financial transaction device.

11. The system of claim 9, wherein verify the connection between the vehicle wallet and the financial transaction device further comprising verify that a code received by way of a graphical user interface associated with the vehicle wallet matches a code received via the financial transaction device.

12. A method, comprising:
executing, on a processor, instructions that cause the processor to perform operations comprising:
transmitting transaction data, associated with a set of transactions from a set of mobile wallets, to a financial transaction device configured to process multiple transactions at once;
prompting a plurality of users to begin additional transactions without having to finish a transaction presently being executed; and
adjusting a balance of a vehicle wallet in response to receiving a notification that the financial transaction device has processed the set of transactions associated with the transaction data.

13. The method of claim 12, further comprising adjusting a balance of the set of mobile wallets in response to adjusting the balance of the vehicle wallet, wherein the set of mobile wallets are adjusted proportionally based on a predetermined condition.

14. The method of claim 12, wherein the adjusting the balance of the set of mobile wallets further comprises at least one of crediting or debiting the balance of the set of mobile wallets based on type of transaction.

15. The method of claim 12, further comprising verifying a connection between the vehicle wallet and the financial transaction device.

16. The method of claim 15, wherein the verifying the connection between the vehicle wallet and the financial transaction device comprises matching a location of a vehicle associated with the vehicle wallet to another location associated with the financial transaction device.

17. The method of claim 15, wherein the verifying the connection between the vehicle wallet and the financial transaction device comprises verifying that a code received by way of a graphical user interface of the vehicle wallet matches a code received by way of the financial transaction device.

18. A computer-readable storage device configured to store instructions, that when executed by a processor perform operations, comprising:
transmitting transaction data, associated with a set of transactions from a plurality of mobile device wallets, to a financial transaction device configured to batch process the set of transactions;
prompting a plurality of users to begin additional transactions without having to finish a transaction presently being executed; and
adjusting a vehicle wallet balance in response to receiving a notification that the financial transaction device has processed the set of transactions associated with the transaction data, wherein the adjusting the vehicle wallet balance comprises adjusting the plurality of mobile device wallets.

19. The computer-readable storage device of claim 18, wherein the financial transaction device is at least one of an automated teller machine device or a point of sale device.

20. The computer-readable storage device of claim 18, further comprising adjusting a balance of the plurality of mobile device wallets in response to adjusting the balance of the vehicle wallet, wherein the plurality of mobile device wallets are adjusted proportionally based on a predetermined condition.

* * * * *

UNITED STATES PATENT AND TRADEMARK OFFICE
CERTIFICATE OF CORRECTION

PATENT NO. : 11,126,998 B1  
APPLICATION NO. : 16/434967  
DATED : September 21, 2021  
INVENTOR(S) : Joseph Bodkin and John Edward Cronin Page 1 of 1

It is certified that error appears in the above-identified patent and that said Letters Patent is hereby corrected as shown below:

On the Title Page

Item (73), Delete:
"Assignee: WELLS FARGO BANK, N.A., San Fransisco, CA (US)"

And Insert:
-- Assignee: WELLS FARGO BANK, N.A., San Francisco, CA (US) --

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*